June 1, 1943.  G. RAYMOND  2,320,447
DEVICE FOR DETERMINING FLOW VOLUME OF TREATING LIQUIDS
Filed Oct. 3, 1940  2 Sheets-Sheet 2
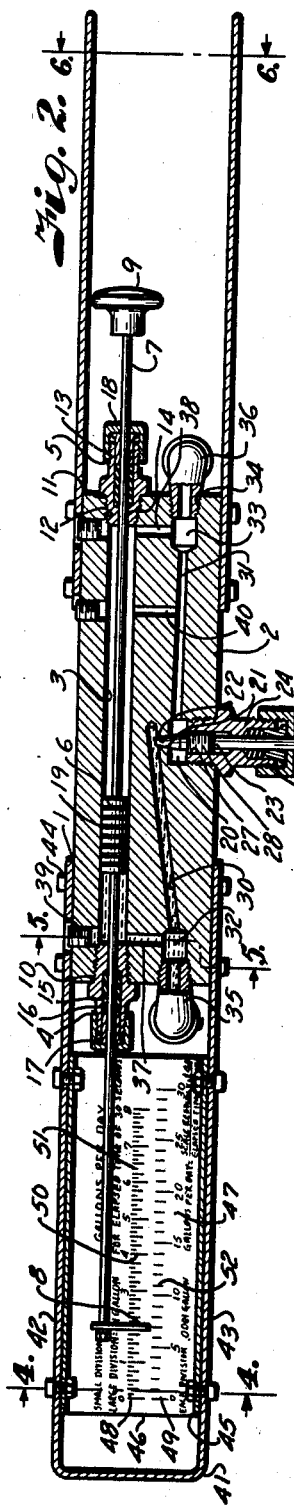
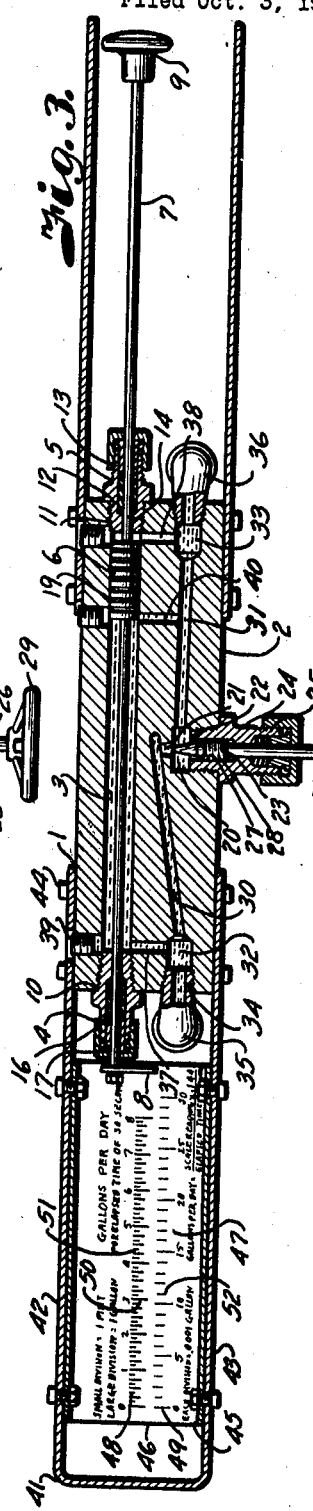
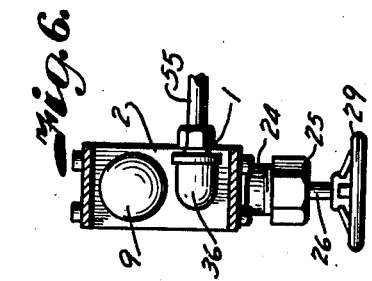
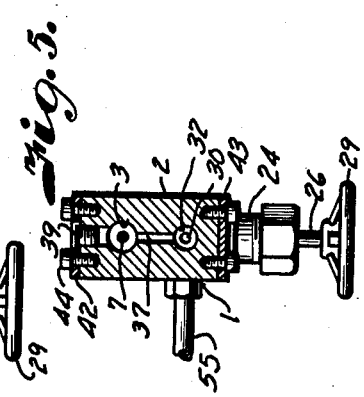
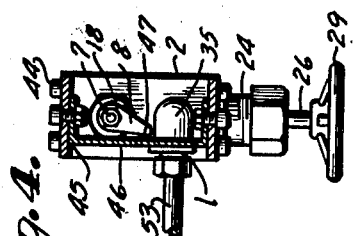
INVENTOR
Gwynne Raymond.
BY
ATTORNEY Patented June 1, 1943

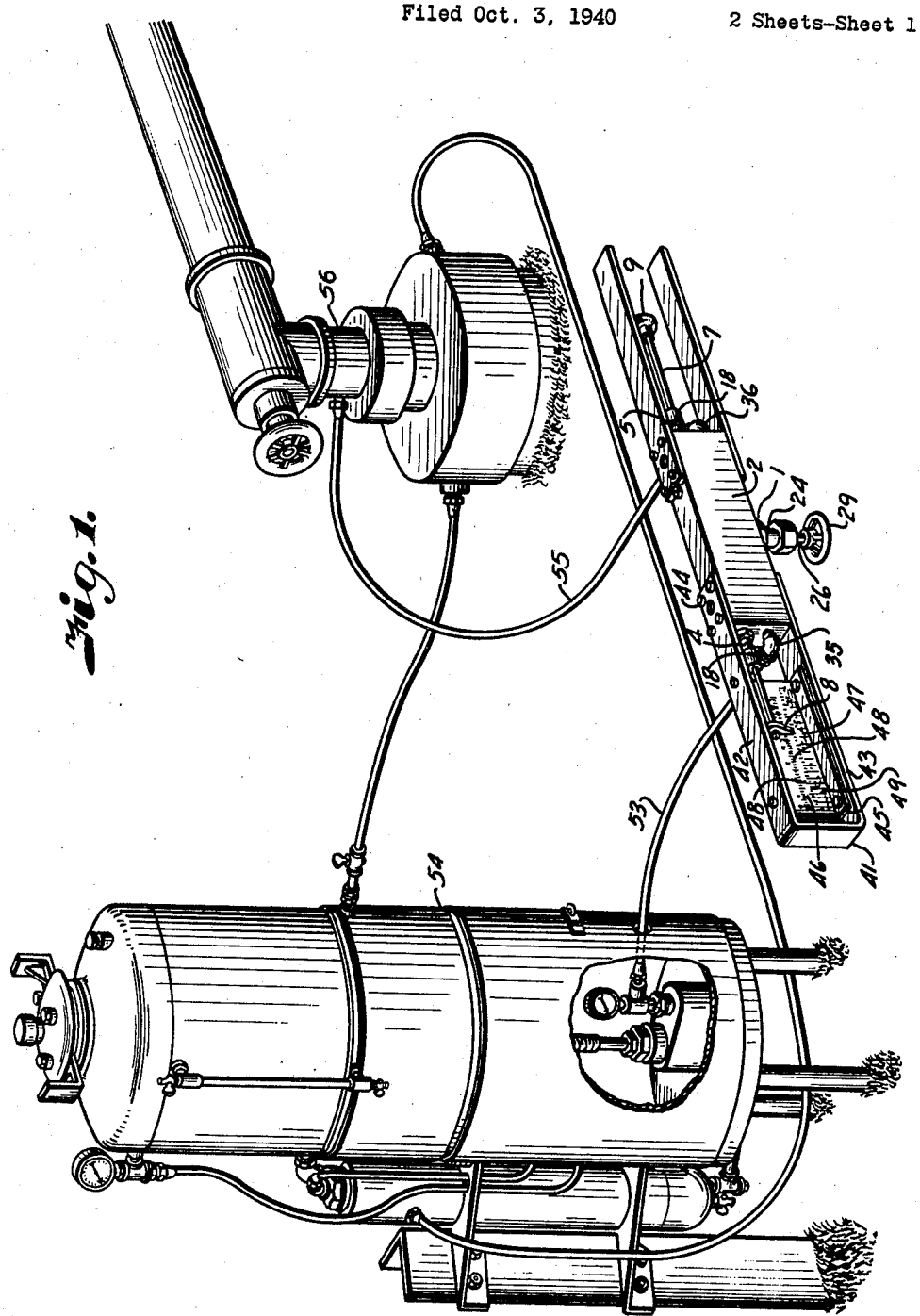

2,320,447

UNITED STATES PATENT OFFICE 2,320,447

DEVICE FOR DETERMINING FLOW VOLUME OF TREATING LIQUIDS

Gwynne Raymond, Oklahoma City, Okla.

Application October 3, 1940, Serial No. 359,541

4 Claims. (Cl. 73—194)

This invention relates to a device for determining the flow volume of fluids particularly under high pressures, for example the flow volume of a chemical inducted into a well stream where the pressures may be as high as three thousand or more pounds per square inch.

Under such high pressures it is impractical to use the customary sight glass arrangement for the reason that sight glasses will not withstand high pressures, and, even if this were the case, the pressure would compress the air in the sight space so that accurate readings would be impossible.

It is, therefore, a principal object of the present invention to provide a simple device for accurately determining flow volume of a fluid under pressure.

In accomplishing this and other objects of the invention, as hereinafter pointed out, I have provided improved structure, the preferred form of which is illustrated in the accompanying drawings, wherein:

Fig. 1 is a perspective view of a device for determining the flow volume of a fluid under pressure, the gauge being illustrated in connection with a feeding device for inducting chemical into an oil well stream.

Fig. 2 is a longitudinal section through the device showing the by-pass valve closed so that the fluid volume to be measured is effective to operate the device.

Fig. 3 is a similar section showing the by-pass valve open and the parts of the device in inoperative position.

Fig. 4 is a cross-section on the line 4—4 of Fig. 2.

Fig. 5 is a cross-section on the line 5—5 of Fig. 2.

Fig. 6 is a cross-section on the line 6—6 of Fig. 2.

Referring more in detail to the drawings:

1 designates a device constructed in accordance with my invention, and which includes a substantially elongated body or cylinder member 2 having a bore 3 extending longitudinally thereof and closed at the ends by packing elements or stuffing boxes 4 and 5. Slidably mounted in the bore 3 is a piston 6 fixed to a rod 7 that projects through the packing elements 4 and 5 so that one end is adapted to carry a pointer member 8 and the other end an operating knob 9 by which the piston is manually positioned in the cylinder. The rod is of sufficient length so that when the piston 6 is at one end of the bore the pointer 8 will closely approach the packing element 4 and the knob 9 will be located a sufficient distance from the packing element 5 to permit shifting of the piston to the opposite end of the bore, as later described.

The packing elements 4 and 5 may be of any suitable construction to prevent leakage around the rod 7 and provide balance thrusts thereon during movement of the piston. In the illustrated instance, the packing elements each include a nipple 10 having threaded ends 11 turned into threaded counterbores 12 at the ends of the bore 3, and tubular body portions 13 projecting from the ends of the body member 2. The inner ends of the nipples have bores 14 of a size to provide sliding fit for the rod 7 and the outer ends are provided with counterbores forming packing recesses 15. Received in the recesses are packings 16 adapted to be compressed about the rod by packing glands 17 backed by caps 18 which are adjustably threaded upon the outer ends of the nipples as clearly illustrated in Fig. 2. The piston 6 is preferably provided with a series of sealing grooves 19 and is lapped into the bore 3 to prevent leakage therearound.

Formed in the body member 2, preferably on the side thereof opposite the bore 3, is a recess 20, having an axial port 21 to seat the needle end 22 of a valve member 23. The valve member 23 is carried by a nipple 24 threaded into the outer end of the recess 20 and which has a packing box 25 to seal about the stem 26 of the valve. The inner end of the nipple terminates short of the bottom of the recess and is provided with a threaded counterbore 27 for threadedly engaging a threaded collar 28 on the valve stem. The outer end of the valve stem projects through the packing box and carries a hand-wheel 29 by which the valve may be moved to and from the port 21 to close and open flow through a by-pass including oppositely directed channels 30—31. The channel 30 connects the port 21 with a recess 32 in the end of the body member 2 adjacent the pointer 8, and the channel 31 connects the recess 20 with a recess 33 in the opposite end of the body 2. The recesses 32 and 33 open outwardly through the ends of the body member and are internally threaded, as at 34, to receive street ells 35 and 36 respectively. The recesses 32 and 33 are connected with the ends of the bore 3 by channels 37 and 38 respectively, which are formed by drilling through the opposite side of the body 2 and closing the outer ends of the drill opening by plugs 39 that are threaded thereinto and which are adapted to be loosened for venting air from the bore 3. The bore 3 also connects with the channel 31 through a channel 40 spaced from the channel 38 a distance substantially corresponding to the length of the piston, so that when the piston is at that end of the cylinder fluid in the bore 3 may flow therefrom into the channel 31 for discharge through the street ell 36.

Fixed to the pointer end of the body member 2 is a yoke-shaped guard 41, having parallel arms 42—43 fixed to the body 2 by suitable fastening devices 44. The guard 41 is of sufficient length to accommodate the pointer when the piston is moved to the pointer end of the bore 3. Fixed between the arms 42 and 43 of the guard is a channel member 45 having a web portion 46 offset laterally from the axis of the rod, as clearly shown in Fig. 4, so that the pointer is movable over the face side 47 thereof to indicate relative position of the piston with respect to the bore on scales 48—49. The scale 48 is for indicating gallons per day for elapsed time of thirty seconds and has major graduations 50 representing gallons and minor graduations 51 representing pints. The lower scale 49 is for ascertaining gallons per day, and each division 52 represents .0001 gallon, the position of the pointer being taken after one or more minutes of flow.

A device as above described is shown in conjunction with a chemical feeding apparatus of the type illustrated in Patent No. 2,163,436 issued June 20, 1939, to myself and Walden W. Mason. In connecting the device the chemical flow line from the feeder 54 is severed and the discharge line section 53 from the chemical feeder 54 is connected with the street ell 35. The other section 55 which leads to the well tubing 56 is connected with the street ell 36 as clearly shown in Fig. 1.

Upon initial operation of the device, the air vent plugs 39 are loosened so that the air is dispelled by pressure of the chemical, and after all of the air has been crowded out, the bore 3 and channels are completely filled with chemical. The plugs are then retightened, the needle valve 22 being opened so that the chemical by-passes through the channel 30, valve port 21 and channel 31 to the flow tubing 56.

To test rate of feed of the chemical, the piston 6 is moved to the end of the cylinder having the channel 37 until the pointer reaches the zero point of the scale 48. This is readily effected by pushing against the knob 9. Then with a stop watch in hand, the needle valve is suddenly closed so that the chemical discharged from the pump is diverted through the channel 37 to act against the piston 6 and start movement thereof to the right, Fig. 2. At the end of one minute, the position of the pointer on the lower calibrated scale is noted to determine the number of .0001 gallon of chemical actually inducted into the flow during the elapsed time of one minute. The gallons per day may then be readily calculated by multiplying the scale reading as indicated by the pointer, times .144, and dividing the result by the elapsed time which is one minute. For example, if the pointer reaches the scale calibration 5, after one minute, the gallons of chemical fed to the well flow are .72 gallon per day. If desired, longer readings may be made, for example by noting position of the pointer after two, three, five or more minutes, and then making the calculations as above pointed out.

If desired, quicker but perhaps less accurate reading of the numbers of gallons per day may be made directly from the upper scale 48 by noting position of the pointer thereon after an elapsed time of thirty seconds. If the operator should fail to open the valve after a reading has been taken, the piston will continue its movement to the opposite end of the bore, but as soon as the channel 40 is uncovered the liquid by-passes the valve by way of the bore 3 and channel 40.

From the foregoing it is obvious that with one of these devices in the line between the chemical feeder and the well flow, chemical fed may be checked at any time, merely by closing the needle valve and observing the position of the pointer after an elapsed period.

While I have particularly described the invention as applicable to a chemical feeder, it is obvious that it may be adapted for testing flow of any fluid under high pressures, without departing from the spirit of the invention.

What I claim and desire to secure by Letters Patent is:

1. In combination with a feeder for feeding liquid chemical into a well flow line, a cylinder, a piston in the cylinder, means connecting one end of the cylinder with the feeder and the other end with the flow line whereby the liquid moves the piston in the cylinder at the speed of the liquid fed by the feeder, a rod connected with the ends of the piston and projectable through the ends of the cylinder, stuffing boxes closing the ends of the cylinder and sealingly engaging said rod, a scale member, a pointer member, means carrying one of said members in fixed relation with the cylinder, means connecting the other member with one of the projecting ends of said rod for movement relatively to the fixed members, a by-pass connecting the ends of the cylinder, and a valve in said by-pass.

2. In combination with a feeder for feeding a liquid chemical into a well flow line, a cylinder, a piston in the cylinder, means connecting one end of the cylinder with the feeder and the other end with the well flow line whereby the liquid moves the piston in the cylinder at the speed of the liquid fed by the feeder, a rod connected with the ends of the piston and projectable through the ends of the cylinder, stuffing boxes closing the ends of the cylinder and sealingly engaging said rod, a scale member, a pointer member, means carrying one of said members in fixed relation with the cylinder, and means connecting the other member with one of the projecting ends of said rod for movement relatively to the one member.

3. A device for determining flow volume of a stream of treating fluid including, a cylinder, a piston in the cylinder adapted to be moved in the direction of flow under pressure of the treating fluid, a rod connected with the piston and projectable through ends of the cylinder, stuffing boxes enclosing the ends of the cylinder and sealingly engaging said rod, a scale member, a pointer member, means carrying one of said members in fixed relation with the cylinder, means connecting the other member with a projecting end of said rod for movement relative to said one member responsive to movement of the piston, a by-pass for conducting said entire volume of the stream and having ends connected with the ends of the cylinder, a valve in said by-pass for diverting the entire flow volume to act upon the piston and move the piston in the direction of the flow to move the fluid ahead of said piston, and a manually manipulatable knob on one projecting end of the rod to move the piston in the opposite direction when the valve in the by-pass is opened.

4. A device for determining flow volume of a stream of treating fluid including, a cylinder, a piston in the cylinder adapted to be moved in the direction of flow under pressure of the treating fluid, a rod connected with the piston and projectable through ends of the cylinder, stuffing boxes enclosing the ends of the cylinder and sealingly engaging said rod, a scale member, a pointer member, means carrying one of said members in fixed relation with the cylinder, means connecting the other member with a projecting end of said rod for movement relative to said one member responsive to movement of the piston, a by-pass for conducting said entire volume of the stream and having ends connected with the ends of the cylinder, and valve in said by-pass for diverting the entire flow volume to act upon the piston and move the piston in the direction of the flow to move the fluid ahead of said piston.

GWYNNE RAYMOND.